United States Patent [19]
Sauro et al.

[11] Patent Number: 6,112,888
[45] Date of Patent: *Sep. 5, 2000

[54] NON-RECLOSABLE PACKAGES CONTAINING DESICCANT MATRIX

[75] Inventors: Raymond J. Sauro; James Neil Pryor, both of West Friendship, Md.; Jia-Ni Chu, Wilmington, Del.

[73] Assignee: W. R. Grace & Co.-Conn., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,401

[22] Filed: Jun. 28, 1996

[51] Int. Cl.$^7$ ................................................. B65D 85/00
[52] U.S. Cl. ................................ 206/204; 53/111 R
[58] Field of Search ............................ 206/204, 524.1, 206/524.4; 428/355 R; 53/111 R

[56] References Cited

U.S. PATENT DOCUMENTS

| | | | |
|---|---|---|---|
| 2,842,223 | 7/1958 | Zall . | |
| 3,091,550 | 5/1963 | Doying | 117/76 |
| 3,211,503 | 10/1965 | Barnes . | |
| 3,343,897 | 9/1967 | Keller . | |
| 3,704,806 | 12/1972 | Plachenov et al. | 220/64 |
| 3,722,188 | 3/1973 | Cullen | 55/384 |
| 3,734,283 | 5/1973 | Simmons | 206/42 |
| 3,832,827 | 9/1974 | Lemelson | 53/111 |
| 3,833,406 | 9/1974 | White | 117/97 |
| 4,036,360 | 7/1977 | Deffeyes | 206/204 |
| 4,093,105 | 6/1978 | Russell et al. | 220/373 |
| 4,177,365 | 12/1979 | Blackman | 200/19 |
| 4,412,617 | 11/1983 | Ceswin . | |
| 4,441,609 | 4/1984 | Crowley | 206/204 |
| 4,637,197 | 1/1987 | Banfield | 53/428 |
| 4,747,488 | 5/1988 | Kikuchi | 206/444 |
| 4,753,352 | 6/1988 | Dauphin et al. | 206/538 |
| 4,777,780 | 10/1988 | Holzwarth | 53/432 |
| 4,852,732 | 8/1989 | Wilski et al. . | |
| 4,957,521 | 9/1990 | Cullen et al. | 55/387 |
| 5,080,225 | 1/1992 | Russo et al. | 206/204 |
| 5,161,686 | 11/1992 | Weber et al. | 206/440 |
| 5,223,220 | 6/1993 | Fan et al. | 422/58 |
| 5,244,707 | 9/1993 | Shores | 428/76 |
| 5,304,419 | 4/1994 | Shores | 428/355 |
| 5,322,161 | 6/1994 | Shichman et al. | 206/204 |
| 5,378,428 | 1/1995 | Inoue et al. | 422/9 |
| 5,390,475 | 2/1995 | Iwauchi et al. | 53/474 |
| 5,500,067 | 3/1996 | Jenkner | 156/146 |
| 5,962,333 | 5/1999 | Incorvia et al. | 436/169 |

*Primary Examiner*—Jacob K. Ackun
*Attorney, Agent, or Firm*—Charles A. Cross

[57] ABSTRACT

A substantially solvent-free molten or fluid desiccant/organic matrix composition is adhered to a package whereby the desiccant is in communication with a compartment of the resulting package such that the compartment is desiccated by the desiccant composition. The desiccant composition preferably contains a thermoplastic organic matrix, is heated before it is adhered to the package, and cools after application. In some instances, the desiccant matrix may be adhered to a component of the package contents. The package is preferably non-reclosable and suitable for holding an article such as a drug, medical device or electronic device.

42 Claims, No Drawings

NON-RECLOSABLE PACKAGES CONTAINING DESICCANT MATRIX

BACKGROUND OF THE INVENTION

The packaging drugs, pharmaceuticals, medical devices, electronics and other articles in non-reclosable packaging has become widespread and continues to grow especially with advances in materials and automated packaging equipment (e.g. form/fill/seal machinery, fill/seal machinery, etc.). Today, many over-the-counter drugs (tablets, pills, capsules, gel caps, lozenges, etc.), medical devices, diagnostic test kits, and equipment are packaged in so-called "blister packs."

With these advances in packaging, the ability to effectively provide a desiccated package environment has often been difficult because conventional desiccant forms (e.g. pouches, sachets, tablets) are not suitable for use in high speed packaging operations. Conventional desiccant forms may also create problems to the extent that they are not adhered to or are easily detached from the packaging. Thus, conventional forms of desiccants may be problematic where the package is designed to contain comestibles in as much as the desiccant may be accidentally ingested by the consumer.

Conventional desiccants are also problematic in that it is difficult to associate an appropriate amount of desiccant with a particular package environment. While conventional desiccant forms come in different sizes, the range of sizes is fairly limited and is constrained by the need for the desiccant to be in a manageable form. Conventional desiccant forms may also adversely affect the appearance of the package.

There have been some packaging applications where the use of polymer bound desiccants. Unfortunately, this use has generally involved the use of solvents or vehicles which must be evaporated before closure of the package. Needless to say, systems requiring evaporation of solvents are virtually unworkable for high speed automated packaging processes where the time between filling and sealing is extremely short. Such systems also present problems relative to food/drug packaging where in the materials may require government approval.

Thus, there is an need for alternative desiccant forms and application techniques for non-reclosable and other packaging applications.

SUMMARY OF THE INVENTION

The invention provides alternative desiccant forms and techniques for incorporation of desiccants into modern-day packaging, especially non-reclosable packaging.

In one aspect, the invention encompasses a method of adhering a substantially solvent-free molten or fluid desiccant/organic matrix composition to a package whereby the desiccant is in communication with a compartment of the resulting package such that the compartment is desiccated by the desiccant composition. The method preferably uses a thermoplastic organic matrix. The desiccant matrix composition is preferably heated before it is adhered to the package and cools after application. In some instances, the desiccant matrix may be adhered to a component of the package contents.

In another aspect, the invention encompasses non-reclosable packages having at least one non-reclosable sealed compartment adapted to contain an article or substance wherein the package contains a desiccant composition comprising a desiccant in an organic matrix, the desiccant composition being adhered to a portion of the package and being in communication with the compartment whereby the compartment is desiccated by the desiccant composition. The organic matrix preferably comprises a thermoplastic resin. The desiccant composition preferably is essentially solvent-free. The package compartment is preferably suitable for holding an article such as a drug, medical device or electronic device. In some instances, the desiccant composition may be adhered to a component of the package contents.

The invention is especially useful for the packaging of one-time-openable non-reclosable packaging (blister packs, tear open pouches, etc.). These and other aspects of the invention are described in further detail below.

DETAILED DESCRIPTION OF THE INVENTION

The invention encompasses methods of providing desiccant functionality to a package via a desiccant/organic matrix composition. The methods of the invention are preferably characterized by the absence of solvents (e.g. water, organic solvent). The methods of the invention preferably are characterized by the adhering a heated, thermoplastic desiccant/organic matrix composition to the package. The invention is especially useful for automated packaging operations and for non-reclosable packages. The invention is also especially useful in one-time-openable non-reclosable packaging (e.g. blister packs, tearable pouches) for drugs, pharmaceuticals, foods, and consumer products.

"Non-reclosable" is meant to include all packages and containers where a compartment of the package or container adapted to contain the desired article or substance can not be reclosed after opening without some physical alteration of the package. Conventional pill bottles with snap or screw caps would be considered as reclosable packages whereas blisters in a blister pack would be considered non-reclosable. Similarly, compartments for storing electronics would be considered reclosable if they were held closed by reclosable fasteners (e.g. screws) whereas a compartment which was sealed by solder would be considered non-reclosable.

"One-time-openable" is meant to indicate that the package or container can be opened once (after initial sealing) without destroying the contents thereof. Thus, a blister pack having a rupturable or peelable cover layer or web would be considered one-time-openable. Most tearable pouches would also be considered as one-time-openable, presuming that they do not contain an alternative sealing means designed for use after the initial opening.

The desiccants useful in the invention may be conventional water-adsorbing material such as zeolites, silica gels, activated carbons, silica aluminas, non-zeolite molecular sieves, etc. Non-reactive inorganic oxide desiccants are generally preferred. Zeolite A, especially zeolite 3A is a most preferred water-adsorbing material. If desired, adsorbents designed to adsorb low molecular weight organic compounds (e.g. zeolite 13X) may be blended with the water-adsorbing material.

The organic matrix may contain various polymer components. Preferably, the organic matrix is one which is flowable in the absence of a solvent or dispersing vehicle. The organic matrix preferably comprises a thermoplastic resin such that the overall desiccant/organic matrix composition behaves as a thermoplastic. The thermoplastic resin preferably comprises one or more polyolefin resins, e.g. polyethylene, polypropylene, olefin copolymers, olefin terpolymers or combinations thereof; however in some instances other thermoplastic resin systems may also be employed. The thermoplastic resin should be such that the resulting desiccant/organic matrix composition is capable of flowing on heating to a temperature which is compatible with the particular packaging operation. Further, the resin should be selected such that the desiccant composition has the sufficient mechanical integrity at the temperature of interest for the specific package application. For example, if the package is expected to see exposure to temperatures greater than ambient temperature during or prior to use, the desiccant/organic resin composition should be able to retain its shape and position in the package (i.e. it should not undergo substantial flow) under the expected conditions. Preferably, the resin system is selected such that the desiccant/organic matrix composition can be flowed into place without any adverse effects such as "stringers"—trails of resin coming off of the deposited composition.

The invention is open to the use of any thermoplastic resin system which meets the above mentioned performance criteria while also meeting any other compositional requirements which may be involved in the specific packaging application. The resin preferably has a softening point (ring and ball) of about 30–200° C., more preferably about 50–150° C. Where the resin is crystalline, it preferably has a melting point of about 50–250° C., more preferably about 80–200° C. For many pharmaceutical packaging applications, resins having a Brookfield melt viscosity (@ 125° C., spindle #27,100 RPM, shear rate=34 sec$^{-1}$) of 75–200 centipoise (more preferably 125–175 cP) are preferred. In other instances involving higher temperature applications, low density polyethylene resins having a Brookfield melt viscosity (@ 190° C.) of about 2000–4500 centipoise, more preferably about 2500–3500 cP may be used. In some circumstances, higher melt viscosity resins such as polypropylene may also be useful. Combinations of resins may be used to tailor the rheological properties of the desiccant/organic matrix composition. For applications requiring high speed application through small orifices, polyethylene waxes having a weight average molecular weight or about 3000–5000 are preferred. All Brookfield melt viscosities specified herein were measured with a Brookfield Thermosel, model HBDV-III apparatus.

If necessary, the organic matrix may contain up to about 30 wt.% (more preferably 0–15%) of a tackifier resin based on the total weight of all resins in the desiccant matrix composition. Preferred tackifiers are butene-1 propylene copolymer (REXTAC RT 2715 from Rexene Corp.) or blends thereof with other commercial tackifier resins. The organic matrix may also contain auxiliary components such as coloring agents, scents, lubricants, stabilizers, etc. For most applications, auxiliary components are kept to a minimum or are avoided entirely.

The relative amount of desiccant component in the desiccant/organic matrix composition may be varied considerably, depending on the desired adhesive and/or rheological properties of the composition, the adsorption capacity of the desiccant component, the desired adsorption capability in the package environment, etc. In general, the desiccant/organic matrix compositions used in the invention preferably contain at least about 15 wt. % desiccant, more preferably about 20–80%, most preferably about 30–60 wt. %. Where an adsorbent for removing low molecular weight organic volatiles is also used, preferably the combination of the desiccant and such organic adsorbent fall within the above ranges. Preferably the organic adsorbent represents less than about 10 wt. % of the total of desiccant and organic adsorbent.

The desiccant/organic matrix composition of the invention may be formed using conventional compounding techniques. For example, the components can be simply loaded into a kneader extruder, twin screw extruder or other appropriate device to obtain the composition with the desired degree of desiccant dispersion. The formation of the desiccant/organic matrix composition is preferably characterized by the absence of any solvent.

The desiccant/organic matrix compositions may be used in a variety of packaging configurations and in a variety of conventional packaging processes. Preferably, the desiccant compositions of the invention are used in non-reclosable packaging, more preferably in one-time openable, non-reclosable packaging. Preferred packaging techniques are form/fill/seal and fill/seal type processes. These processes are well known in the packaging art. See for example, "Packaging Drugs and Pharmaceuticals" by Wilmer A. Jenkins et al., Technomic Publishing, Lancaster, Pa., 1993, and "Medical Device Packaging Handbook," Ed. by Joseph D. O'Brien, Marcel Dekker, Inc., New York, 1990. Equipment for carrying out these packaging processes is also disclosed in the journals, "Packaging Technology & Engineering" and "Pharmaceutical & Medical Packaging News." The disclosures of these publications is incorporated herein by reference.

In these processes, the desiccant/organic matrix compositions of the invention can be applied using equipment known for depositing hot melt adhesives such as equipment manufactured by Airprint Systems Inc., The Dexter Corp., Nordson Corp., Spraymation, Inc. and others. See the listing in "Packaging Technology & Engineering," November/December 1995, pages 10–12. Using this equipment, it is possible to deposit the desiccant/organic matrix compositions of the invention via spraying, rolling, extrusion, etc. A preferred unit is the Nordson AG-900 Modular Dispensing Gun.

The general method of the invention preferably involves heating the desiccant/organic matrix composition to a suitable temperature in order to reduce its viscosity to a point where the composition can be flowed using the desired application technique. For example, where the composition is applied by extrusion on a low speed manufacturing line, a higher viscosity may be usable compared to higher speed manufacturing lines or where the composition is applied by spraying or dripping. Typically, the composition will be heated to about 50–250° C. to affect the necessary viscosity reduction. Once deposited, the desiccant composition would be allowed to cool whereby the composition becomes fixed in the desired position. Extrusion under pressure through an orifice is generally the most preferred application technique from the point of speed and ease of control. The method of the invention may be practiced before, during or after filling of the package with its desired contents. The filling and sealing of the package may be performed using the conventional techniques for the particular type of packaging. For most packaging applications, a heat or adhesive sealing technique may be employed. The method of the invention is not limited to any particular package construction or packaging technique. The method of the invention is preferably characterized by the absence of solvent from the desiccant/organic matrix composition at least at the time of application, but more preferably throughout the entire method.

In blister packaging where cavities are formed in a continuous web for subsequent filling and sealing, the desiccant composition of the invention is preferably extruded into either a portion of the cavity wherein the article or substance to be packaged is placed in the same cavity or may be placed in a separate cavity which communicates with the cavity containing the article/substance in the final package. Alternatively, but less preferably, the desiccant composition of the invention may be applied (e.g. as a dot matrix) to the sheet forming the cover for the cavities such that the desiccant composition is present on the portions of the cover sheet which reside over the cavities of the continuous web on the side of the cover sheet which defines the top of the cavities.

For fill/seal processes (e.g., wherein two plastic sheets are sealed against each other to create an envelope or tube which is subsequently filled and sealed) the desiccant composition of the invention may be applied to a surface of one or both sheets which surface forms an interior surface of the envelope or tube. This is preferably done before the envelope or tube is filled with the article or substance to be packaged.

The desiccant compositions of the invention may be applied to other known package configurations where a desiccating function is desired. For example, in the packaging of electronic devices, the desiccant compositions of the invention may be applied to the package interior or even to an article to be contained in the package (e.g. to a non-moving part in a magnetic disk drive). Where a carrier device (e.g., a tray) is used to hold one or more articles in a single compartment, the desiccant matrix composition may be adhered to the carrier device. The carrier device would then be placed in the compartment (e.g. two flexible webs joined together to form a pouch) which is then sealed.

Other examples of packaging where the desiccant compositions of the invention are useful are disclosed in U.S. Pat. Nos. 3,211,503; 3,734,283; 3,343,897; 4,753,352; 4,777,780; 5,080,225; 5,223,220; 5,322,161 and 5,390,475. The disclosures of these patents are incorporated herein by reference.

The following examples illustrate just some of the desiccant/organic matrix compositions which are useful in the invention.

EXAMPLE 1

A desiccant/organic matrix composition was formed by combining the following ingredients in a kneader extruder:

|  | Parts by weight |
| --- | --- |
| Polyethylene Wax (Epolene ® N-14) | 49.8 |
| Thermal stabilizer (Irganox ® 1010) | 0.3 |
| Zeolite 3A (Grace Davison) | 44.9 |
| Zeolite 13X (Grace Davison) | 5.0 |

The resulting composition exhibited a Brookfield melt viscosity of 680 cP at 149° C., 34 sec$^{-1}$. The composition also had a water adsorption rate of 8.38 wt. % at 84% R.H. over 3 days. The composition was tested for stringiness by inserting a metal pin into the molten composition (149° C.) and removing the pin. No strings of composition were observed.

EXAMPLE 2

A desiccant/organic matrix composition was formed by combining the following ingredients in a kneader extruder:

|  | Parts by weight |
| --- | --- |
| Polyethylene Wax (Epolene ® N-14) | 37.3 |
| Tackifier (REXTAC RT 2715) | 12.5 |
| Thermal Stabilizer (Irganox ® 1010) | 0.3 |
| Zeolite 3A (Grace Davison) | 44.9 |
| Zeolite 13X (Grace Davison) | 5.0 |

The resulting composition exhibited a Brookfield melt viscosity of 2460 cP at 149° C., 34 sec$^{-1}$. The composition also had a water adsorption rate of 8.9 wt. % at 84% R.H. over 3 days. The composition was tested for stringiness by inserting a metal pin into the molten composition (149° C.) and removing the pin. No strings of composition were observed.

EXAMPLE 3

A desiccant/organic matrix composition was formed by combining the following ingredients in a Nauta mixer:

|  | Parts by weight |
| --- | --- |
| Olefin Terpolymer (Eastman T1035) | 41.1 |
| Tackifier (polyisobutylene) | 4.1 |
| Thermal Stabilizer (Irganox ® 1010) | 0.3 |
| Zeolite 3A (Grace Davison) | 45.0 |
| Zeolite 13X (Grace Davison) | 5.0 |
| Coloring agent (TiO$_2$ + carbon black) | 4.5 |

The resulting composition exhibited a Brookfield melt viscosity of 1250 cP at 190° C., 110 sec$^{-1}$ and a Brookfield melt viscosity of 1.5×10$^6$ cP at 124° C., 0.125$^{-1}$, spindle #29, 0.5 rpm. The composition also had a water adsorption rate of 11.3 wt. % at 84% R.H over 3 days. The composition was tested for stringiness by inserting a metal pin into the molten composition (218° C.) and removing the pin. No strings of composition were observed.

What is claimed is:

1. A method of preparing a desiccated package in an automated, continuous manufacturing process, said packaging having a compartment being adapted to contain an article or substance in a sealed environment, said method comprising (a) preparing a composition comprising desiccant and organic matrix wherein the organic matrix comprises thermoplastic resin, (b) applying the desiccant/organic matrix composition as a substantially solvent-free fluid composition to a portion of the package to which the desiccant/organic matrix composition is adhered with substantially no stringing, (c) completing the formation of said compartment, (d) filling the package with the article and (e) sealing said compartment whereby said desiccant is in communication with said compartment such that said compartment is desiccated, and wherein steps (b) through (e) are conducted in a continuous fashion.

2. The method of claim 1 wherein said organic matrix comprises a polyolefin resin.

3. The method of claim 1 wherein said desiccant/organic matrix composition is heated before it is applied and adhered to said package and said composition cools after said adhesion.

4. The method of claim 1 wherein said package is formed from one or more continuous webs having surfaces which define said compartment and said desiccant/organic matrix composition is adhered to one or more of said surfaces.

5. The method of claim 1 wherein said compartment is sealed after said desiccant/organic matrix composition is adhered to said package.

6. The method of claim 1 wherein said package comprises at least two sealed compartments which communicate with each other wherein the desiccant/organic matrix composition is adhered to the interior of one of said compartments and the other compartment is desiccated by said composition.

7. The method of claim 1 wherein the fluid composition in (b) flows through an orifice and the composition is adhered to the package after passage through the orifice.

8. The method of claim 7 wherein pressure is applied to the composition to accelerate flow of the composition through the orifice.

9. The method of claim 1 wherein the desiccant is selected from the group consisting of silica gels, zeolites, silica aluminas, non-zeolite molecular sieves, activated carbon, and mixtures thereof.

10. The method of claim 1 wherein a non-reclosable package is prepared.

11. A method according to claim 1 wherein the desiccant/organic matrix composition comprises at least 15% by weight desiccant.

12. A method according to claim 1 wherein the desiccant/organic matrix composition comprises at least 20–80% by weight desiccant.

13. A method according to claim 1 wherein the desiccant/organic matrix composition comprises at least 30–60% by weight desiccant.

14. A method according to claim 1 wherein the thermoplastic resin has a Brookfield melt viscosity of 75–200 centipoise at 125° C. and shear rate of 34 $sec^{-1}$.

15. A method according to claim 1 wherein the thermoplastic resin has a Brookfield melt viscosity of 2000–4500 centipoise at 190° C. and shear rate of 34 $sec^{-1}$.

16. A method of preparing a desiccant package in an automated, continuous manufacturing process, said package housing a compartment being adapted to contain an article in a sealed environment, said method comprising (a) preparing a composition comprising desiccant and organic matrix wherein the organic matrix comprises a thermoplastic resin, (b) applying the desiccant/organic matrix composition as a substantially solvent-free fluid desiccant/organic matrix composition to a portion of the article to which the desiccant/organic matrix composition is adhered with substantially no stringing, (c) completing the formation of the compartment whereby the article having the adhered desiccant composition is located in the compartment, and (d) sealing the article-containing compartment whereby the desiccant is in communication with the compartment such that the compartment is desiccated, and wherein steps (b) through (d) are conducted in a continuous fashion.

17. The method of claim 16 wherein the article is a carrier device for one or more other articles or substances.

18. The method of claim 16 wherein a non-reclosable package is created by said sealing.

19. A non-reclosable package having at least one non-reclosable sealed compartment adapted to contain an article or substance wherein said package contains desiccant composition comprising a desiccant in an organic matrix comprising thermoplastic resin, said desiccant composition being adhered to said package wherein substantially no strings of resin extend from the desiccant composition and the desiccant composition is in communication with said compartment and whereby said compartment is desiccated by said desiccant composition.

20. The package of claim 19 wherein said package comprises a plurality of said compartments.

21. The package of claim 19 wherein said organic matrix comprises a thermoplastic polyolefin resin.

22. The package of claim 19 wherein said desiccant is selected from the group consisting of silica gels, zeolites, silica aluminas, non-zeolite molecular sieves, activated carbon and mixtures thereof.

23. The package of claim 19 wherein said desiccant comprises zeolite 3A.

24. The package of claim 19 wherein said desiccant comprises a combination of zeolite 3A with either zeolite 13X or silica gel.

25. The package of claim 21 wherein said polyolefin resin is a polyethylene wax.

26. The package of claim 25 wherein said polyethylene wax has a weight average molecular weight of 3000–5000.

27. The package of claim 19 wherein said desiccant composition is adhered to a portion of an interior surface of said compartment.

28. The package of claim 19 wherein said package comprises an additional compartment in communication with said sealed compartment wherein said desiccant composition is adhered to an interior portion of said additional compartment.

29. The package of claim 19 wherein said sealed compartment is adapted to contain at least one article selected from the group consisting of tablets, pills, capsules, gel caps, lozenges or mixtures thereof.

30. The package of claim 19 wherein said sealed compartment is adapted to contain a medical device or diagnostic test kit.

31. The package of claim 19 wherein said package is adapted to contain an electronic device.

32. The package of claim 19 wherein said sealed compartment is defined by a cavity in a continuous flexible web and a cover sheet which is sealed against said cavity-containing web at the perimeter of said cavity.

33. The package of claim 32 wherein said cover sheet is heat sealed against said web.

34. The package of claim 19 wherein said sealed compartment is a pouch.

35. A package of claim 19 wherein the desiccant composition comprises at least 15% weight desiccant.

36. A package of claim 19 wherein the desiccant composition comprises at least 20–80% weight desiccant.

37. A package of claim 19 wherein the desiccant composition comprises at least 30–60% weight desiccant.

38. A non-reclosable package having at least one non-reclosable sealed compartment which contains an article wherein a desiccant composition comprising a desiccant in an organic matrix comprising thermoplastic resin is adhered to said article whereby there are substantially no strings of resin extending from the desiccant composition and said compartment is desiccated by said desiccant composition.

39. The package of claim 38 wherein said article is a carrier device for one or more other articles or substances.

40. The method of claim 1 wherein the thermoplastic resin is polyolefin.

41. The method of claim 16 wherein the thermoplastic resin is polyolefin.

42. The method of claim 38 wherein the thermoplastic resin is polyolefin.

* * * * *